(12) United States Patent
Yamagata et al.

(10) Patent No.: US 7,889,802 B2
(45) Date of Patent: Feb. 15, 2011

(54) DEMODULATING DEVICE, METHOD AND PROGRAM

(75) Inventors: Taku Yamagata, Tokyo (JP); Toshihisa Hyakudai, Chiba (JP); Shigenari Kawabata, Kanagawa (JP)

(73) Assignee: Sony Corporation, Tokyo (JP)

( * ) Notice: Subject to any disclaimer, the term of this patent is extended or adjusted under 35 U.S.C. 154(b) by 398 days.

(21) Appl. No.: 11/908,874

(22) PCT Filed: Feb. 6, 2007

(86) PCT No.: PCT/JP2007/052033

§ 371 (c)(1),
(2), (4) Date: Mar. 21, 2008

(87) PCT Pub. No.: WO2007/091562

PCT Pub. Date: Aug. 16, 2007

(65) Prior Publication Data

US 2008/0192844 A1 Aug. 14, 2008

(30) Foreign Application Priority Data

Feb. 6, 2006 (JP) .............................. 2006-028699

(51) Int. Cl.
*H04L 27/28* (2006.01)

(52) U.S. Cl. ...................................................... 375/260

(58) Field of Classification Search .................. 375/260, 375/346, 348, 350; 455/63.1; 370/208, 210
See application file for complete search history.

(56) References Cited

U.S. PATENT DOCUMENTS

| 6,680,901 B1 * | 1/2004 | Yamamoto et al. | 370/208 |
| 7,324,437 B1 * | 1/2008 | Czylwik et al. | 370/210 |
| 7,668,246 B2 * | 2/2010 | Zhidkov et al. | 375/260 |
| 2006/0039491 A1 * | 2/2006 | Han | 375/260 |

FOREIGN PATENT DOCUMENTS

| JP | 11-252040 | 9/1999 |
| JP | 2000-341243 | 12/2000 |
| JP | 2004-247945 | 9/2004 |

* cited by examiner

*Primary Examiner*—Khanh C Tran
(74) *Attorney, Agent, or Firm*—Oblon, Spivak, McClelland, Maier & Neustadt, L.L.P.

(57) ABSTRACT

A demodulator includes a complex conjugate signal generator to generate a complex conjugate signal of an OFDM time domain signal (complex signal including an I channel signal and Q channel signal) supplied from an orthogonal demodulation circuit, a delaying unit to delay, by an integral multiple of a predetermined period 1H or 2H, the complex conjugate signal supplied from the complex conjugate signal generator, a complex multiplier to make complex multiplication on the basis of the complex signal generated by the orthogonal demodulation circuit and complex conjugate signal delayed by the integral multiple of the predetermined period by the delay unit, and a determining unit to determine whether an interference wave is included in the modulated signal by making a comparison between the complex multiplication value resulted from the complex multiplication made by the complex multiplier and an arbitrary threshold.

11 Claims, 9 Drawing Sheets

DEMODULATING DEVICE, METHOD AND PROGRAM

TECHNICAL FIELD

The present invention generally relates to a demodulating apparatus and method for receiving a signal modulated with the technique of orthogonal frequency division multiplexing (OFDM) and demodulating the modulated signal, and more particularly, to a demodulating apparatus and method and a program allowing a computer to make that signal demodulation.

This application claims the priority of the Japanese Patent Application No. 2006-028699 filed in the Japanese Patent Office on Jan. 6, 2006, the entirety of which is incorporated by reference herein.

BACKGROUND ART

If an interference wave exists in a received signal, a filter provided in a receiver to cancel such an interference wave can be turned on to cancel the interference wave, whereby the capability of signal reception of the receiver can be improved. On the other hand, if the filter is turned on in case no interference wave exists in the received signal, the reception performance of the receiver will be deteriorated. Therefore, for setting a receiver's capability of reception, it is very important to accurately determine whether an interference wave is included in the received signal in order to determine whether the filter is to be turned on or not.

Here will be explained an example of the interference wave detecting method having so far been adopted in a receiver that receives a signal modulated with the OFDM (Orthogonal Frequency Division Multiplexing) technique.

FIG. 1 is a schematic block diagram of a transmitter 100 and receiver 200.

The transmitter 100 modulates a bit data row for sending with the OFDM technique and sends the modulated data row. As shown, the transmitter 100 includes a data generator 101, IFFT (Inverse Fast Fourier Transform) unit 102, serializer 103, RF processor 104 and antenna 105.

The data generator 101 generates a bit data row to be sent.

The IFFT unit 102 makes IFFT of the bit data row generated by the data generator 101.

The serializer 103 converts the bit data row subjected to IFFT in the IFFT unit 102 into a serial symbol data row in units of a symbol.

The RF processor 104 multiplies the symbol data row converted by the serializer 103 by a carrier to provide an OFDM signal.

The antenna 105 sends the OFDM signal output from the RF processor 104 to the receiver 200 via a transmission channel.

The receiver 200 receives the OFDM signal sent from the transmitter 100 and demodulates the received OFDM signal with the OFDM technique. As shown, the receiver 200 includes an antenna 201, frequency converter 202, interference wave canceling filter 203, deserializer 204, FFT (Fast Fourier Transform) unit 205, error correction unit 206 and interference wave detector 207.

The antenna 201 receives the OFDM signal via the transmission channel.

The frequency converter 202 converts the OFDM signal received by the antenna 201 into an IF (Intermediate Frequency) signal having an intermediate frequency of a carrier of the OFDM signal.

The interference wave canceling filter 203 reduces a frequency component including the interference wave in the IF signal supplied from the frequency converter 202.

The deserializer 204 makes serial-parallel conversion of a symbol data row of the IF signal from which the interference wave component has been canceled by the interference wave canceling filter 203 to provide a bit data row.

The FFT unit 205 makes FFT of the bit data row supplied from the deserializer 204.

The error correction unit 206 makes a predetermined error correction of the bit data row having been subjected to FFT in the FFT unit 205.

The interference wave detector 207 detects whether an interference wave component is included in the bit data row having been subjected to FFT in the FFT unit 205.

In the receiver 200, the interference wave detector 207 to detect an interference wave is provided downstream of the FFT unit 205 that makes FFT of a received signal and the interference wave canceling filter 203 provided upstream of the FFT unit 205 is turned on on the basis of the result of detection from the interference wave detector 207.

DISCLOSURE OF THE INVENTION

The demodulation system constructed as shown in FIG. 1 is relatively easy to install. In the conventional system, however, once an interference wave is detected and thus the interference wave canceling filter 203 is turned on, it will not be possible to accurately detect the existence of an interference wave.

It is therefore desirable to overcome the above-mentioned drawbacks of the related art by providing a demodulating apparatus and method for detecting an interference wave in a received signal upstream of an FFT unit and canceling the interference wave there and a program allowing a computer to make that signal demodulation.

According an embodiment of the present invention, there is provided a demodulating apparatus that receives a signal modulated with the orthogonal frequency division multiplexing (OFDM) technique and demodulates the modulated signal, the apparatus including:

An orthogonal demodulating means for making orthogonal demodulation of the modulated signal to generate a complex signal including real- and imaginary-axis components;

A complex conjugate signal generating means for generating a complex conjugate signal of the complex signal produced by the orthogonal demodulating means;

A delaying means for delaying, by an integral multiple of a predetermined period, the complex conjugate signal generated by the complex-conjugate signal generating means;

a complex multiplying means for making complex multiplication on the basis of the complex signal generated by the orthogonal demodulating means and complex conjugate signal delayed by the integral multiple of the predetermined period by the delaying means;

a determining means for determining whether an interference wave is included in the modulated signal by making a comparison between the complex multiplication value resulted from the complex multiplication made by the complex multiplying means and an arbitrary threshold; and an interference wave canceling means for canceling an interference wave from the modulated signal on the basis of the result of determination from the determining means.

Also, according to another embodiment of the present invention, there is provided a demodulating method of receiving a signal modulated with the orthogonal frequency division multiplexing (OFDM) technique and demodulating the modulated signal, the method including the steps of:

making orthogonal demodulation of the modulated signal to generate a complex signal including real- and imaginary-axis components;

generating a complex conjugate signal of the complex signal produced in the orthogonal demodulating step;

delaying, by an integral multiple of a predetermined period, the complex conjugate signal generated in the complex-conjugate signal generating step;

making complex multiplication on the basis of the complex signal generated in the orthogonal demodulating step and complex conjugate signal delayed by the integral multiple of the predetermined period in the delaying step;

determining whether an interference wave is included in the modulated signal by making a comparison between the complex multiplication value resulted from the complex multiplication made in the complex multiplying step and an arbitrary threshold; and canceling an interference wave from the modulated signal on the basis of the result of determination made in the determining step.

Also, according to another embodiment of the present invention, there is provided a demodulating program that allows a computer to receive a signal modulated with the orthogonal frequency division multiplexing (OFDM) technique and demodulate the modulated signal, the program including the steps of:

making orthogonal demodulation of the modulated signal to generate a complex signal including real- and imaginary-axis components;

generating a complex conjugate signal of the complex signal produced in the orthogonal demodulating step;

delaying, by an integral multiple of a predetermined period, the complex conjugate signal generated in the complex-conjugate signal generating step;

making complex multiplication on the basis of the complex signal generated in the orthogonal demodulating step and complex conjugate signal delayed by the integral multiple of the predetermined period in the delaying step;

determining whether an interference wave is included in the modulated signal by making a comparison between the complex multiplication value resulted from the complex multiplication made in the complex multiplying step and an arbitrary threshold; and canceling an interference wave from the modulated signal on the basis of the result of determination made in the determining step.

The foregoing and other features, aspects and advantages of the present invention will become apparent from the following detailed description of embodiments of the present invention when taken in conjunction with the accompanying drawings.

BEST MODE FOR CARRYING OUT THE INVENTION

The present invention will be explained in detail below concerning the embodiment thereof with reference to the accompanying drawings.

In Japan for example, the digitalized terrestrial broadcast will be in operation in parallel to the existing analog television broadcast (with the NTSC technique, for example) until July, 2011. It is predictable that in such a broadcasting environment, an interference between adjacent channels, interference between the same channels, etc. will take place in both the analog television broadcast and digital television broadcast. In case the frequency of a broadcast wave used in the digital television broadcast is almost the same as that in the analog television broadcast, a signal received by the digital television broadcast receiver includes an NTSC signal in some cases. In the receiver as the embodiment of the present invention, whether such an NTSC signal is included in the received signal is determined on the basis of the correlation level upstream of an FFT (Fast Fourier Transform) circuit and a detected NTSC signal, if any, is canceled upstream of the FFT circuit.

Also, the receiver as the embodiment of the present invention adopts the ISDB-T (Integrated Services Digital Broadcasting-Terrestrial) standard to receive a signal modulated with the OFDM (Orthogonal Frequency Division Multiplexing) technique and demodulate the modulated signal.

The OFDM technique is such that a plurality of orthogonal sub-carriers is set in the transmission band and data is assigned to the amplitude and phase of each sub-carrier with PSK (Phase Shift keying) and QAM (Quadrature Amplitude Modulation) techniques for digital modulation.

Also, it is widely considered that the OFDM technique is to be applied to the digitalized terrestrial broadcast which will largely be influenced by multipath interference.

Figure 1:
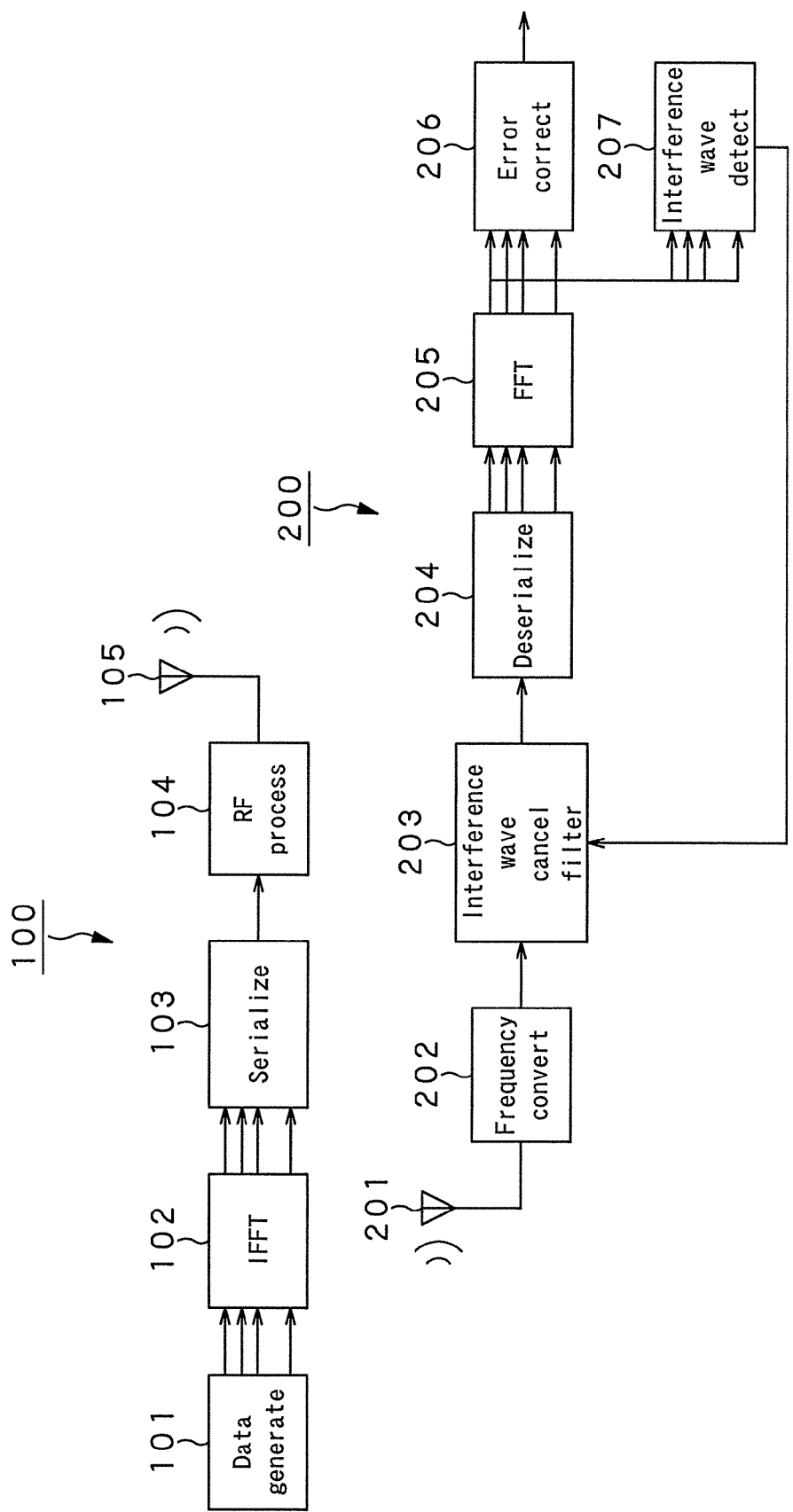
FIG. 1 is a schematic block diagram of a conventional receiver.
Figure 2:
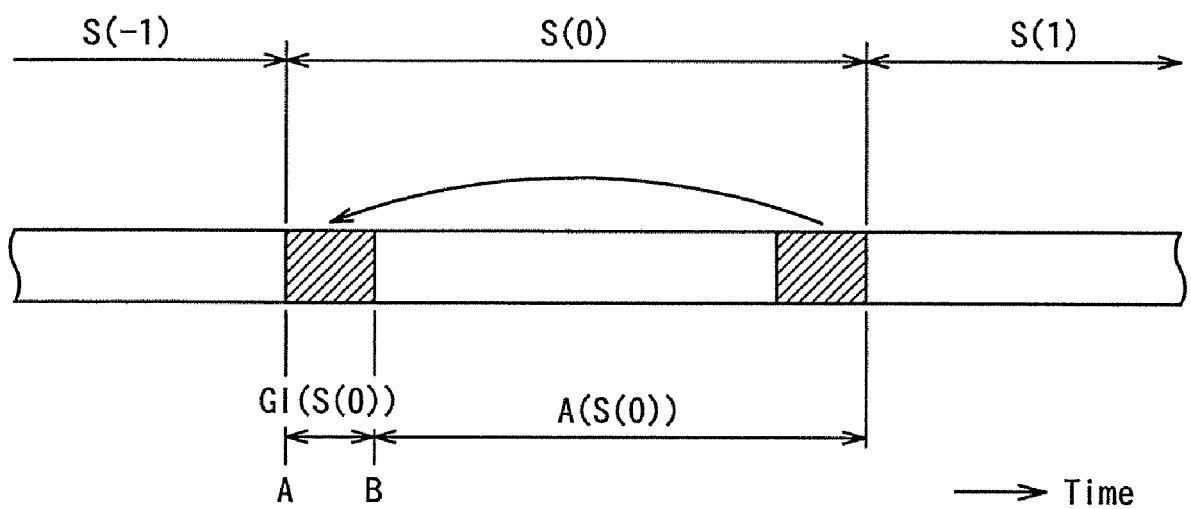
FIG. 2 shows an OFDM signal, OFDM symbols, effective symbol, guard intervals and FFT window.

A signal sent with the OFDM technique is transmitted in units of a symbol called "OFDM symbol" as shown in FIG. 2. It should be noted that in FIG. 2, an OFDM symbol being processed is shown as S(0) and OFDM symbols preceding and next to the OFDM symbol S(0) are shown as S(−1) and S(1), respectively. The configuration of the OFDM symbol will be explained below with consideration given to the OFDM symbol S(0).

As shown, the OFDM symbol S(0) includes an effective symbol A(S(0)) indicating a signal period for which IFFT (Inverse Fast Fourier Transform) is made during transmission and a guard interval GI(S(0)) which is just a copy of a latter portion of the effective symbol A(S(0)) as will be seen. The guard interval GI(S(0)) is positioned in a leading portion of the OFDM symbol S(0). It is a signal whose time duration is ¼ of ⅛, for example, of the that of the effective symbol A(S(0)).

In the OFDM receiver that receives such an OFDM-modulated signal, the FFT circuit makes FFT to demodulate the received OFDM-modulated signal. The OFDM receiver detects the boundary between the effective symbol and guard interval included in the OFDM symbol. Then, it determines, based on the detected boundary position, an FFT window equal in length to the effective symbol, and identifies, based on the OFDM symbol, data in a portion defined by the FFT symbol for FFT.

Figure 3:
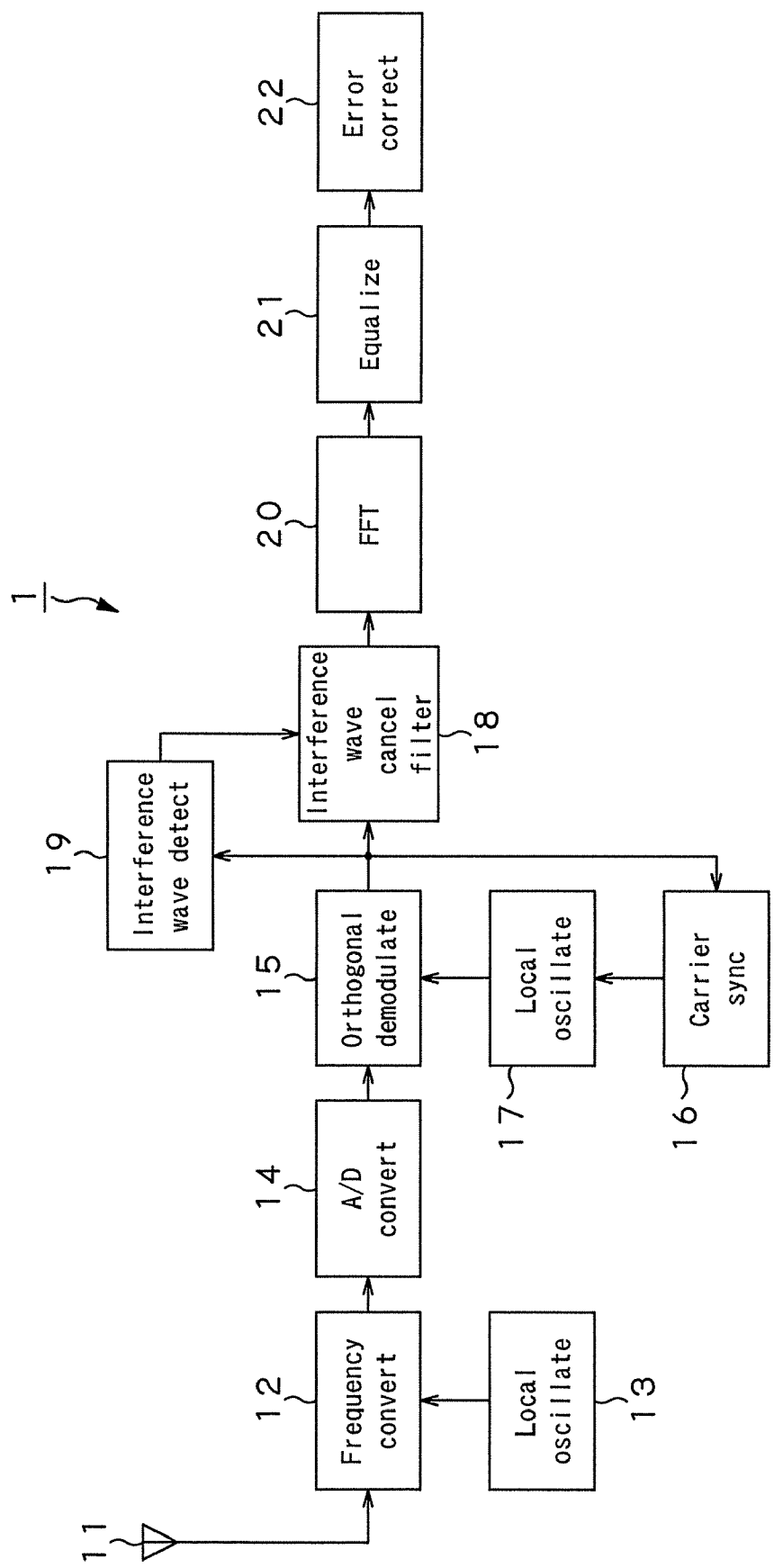
FIG. 3 is a schematic block diagram of the receiver as an embodiment of the present invention.

As shown in FIG. 3, the receiver, generally indicated with a reference symbol 1, includes an antenna 11, frequency converter 12, local oscillator 13, A-D conversion circuit 14, orthogonal demodulation circuit 15, carrier sync circuit 16, local oscillator 17, interference wave canceling filter 18, interference wave detector 19, FFT circuit 20, equalization circuit 21 and error correction circuit 22.

A digital broadcast wave from a broadcast station is received by the antenna 11 of the OFDM receiver 1, and supplied as an RF signal having a carrier frequency fc to the frequency converter 12.

In the frequency converter 12, the RF signal received by the antenna 11 is multiplied by a carrier signal whose frequency is the carrier frequency fc oscillated by the local oscillator 13 plus fIF to provide an IF signal having the intermediate frequency fIF and the IF signal is supplied to the A-D conversion circuit 14 where it will be digitalized. The digitalized IF signal is supplied to the orthogonal demodulation circuit 15.

In the orthogonal demodulation circuit 15, the digitalized IF signal is subjected to orthogonal demodulation using the carrier signal having the intermediate frequency fIF, oscillated by the local oscillator 17 controlled by the carrier sync circuit 16 to provide an base-band OFDM signal. The base-band OFDM signal output from the orthogonal demodulation circuit 15 is a so-called time-domain signal before subjected to FFT. Thus, the base-band signal just after orthogonal-demodulated and before subjected to FFT is called "OFDM time-domain signal". The orthogonal demodulation of the OFDM time-domain signal will result in a real-axis component (I-channel signal) and imaginary-axis component (Q-channel signal). The OFDM time-domain signal output from the orthogonal demodulation circuit 15 is supplied to the carrier sync circuit 16, interference wave canceling filter 18 and interference wave detector 19.

The interference wave canceling filter 18 is to cancel an interference wave included, if any, in the OFDM time-domain signal supplied from the orthogonal demodulation circuit 15.

The interference wave detector 19 detects an interference wave included in the OFDM time-domain signal supplied from the orthogonal demodulation circuit 15 to control the operation of the interference wave canceling filter 18 on the basis of the result of interference wave detection.

The FFT circuit 20 makes FFT of the OFDM time-domain signal from which the interference wave has been canceled to extract data having been orthogonal-demodulated into each of the sub-carriers. The signal output from the FFT circuit 20 is a so-called frequency-band signal after subjected to FFT. Thus, the signal after subjected to FFT is called "OFDM frequency-domain signal".

The FFT unit 20 extracts, from one OFDM symbol, a signal included in a range of the effective symbol length (2048 samples, for example), that is, in a range of one OFDM symbol except for the guard interval, and makes FFT of the extracted ODFM time-domain signal including 2048 samples. More specifically, FFT starts being made anywhere in a range from the boundary of the OFDM symbol to the end of the guard interval. This FFT range is called "FFT window".

The equalization circuit 21 corrects a distortion, if any, of the OFDM frequency-domain signal supplied from the FFT unit 20, having arisen while being transmitted, and supplies the distortion-corrected OFDM frequency-domain signal to the error correction circuit 22. More particularly, the FFT circuit 20 corrects a distortion, if any, of the amplitude and phase of the OFMD frequency-domain signal on the basis of a pilot signal already included in the OFDM frequency-domain signal.

The error correction circuit 22 de-interleaves the OFDM frequency-domain signal having been distortion-corrected by the equalization circuit 21. Further, the error correction circuit 22 makes Viterbi decoding, Reed-Solomon decoding and the like of the de-interleaved signal to demodulate the OFDM frequency-domain signal into information data.

As above, the OFDM frequency-domain signal output from the FFT unit 20 is a complex signal including a real-axis component (I-channel signal) and imaginary-axis component (Q-channel signal) similarly to the aforementioned OFDM time-domain signal. The complex signal is a signal subjected to orthogonal amplitude modulation with the 16QAM technique, 64QAM technique or the like.

The interference wave canceling filter 18 and interference wave detector 19 function as will be explained in detail below. It should be noted that the explanation will be made with the OFDM time-domain signal being taken as a desired signal and interference wave being taken as an analog television signal (NTSC picture signal).

Figure 4A:
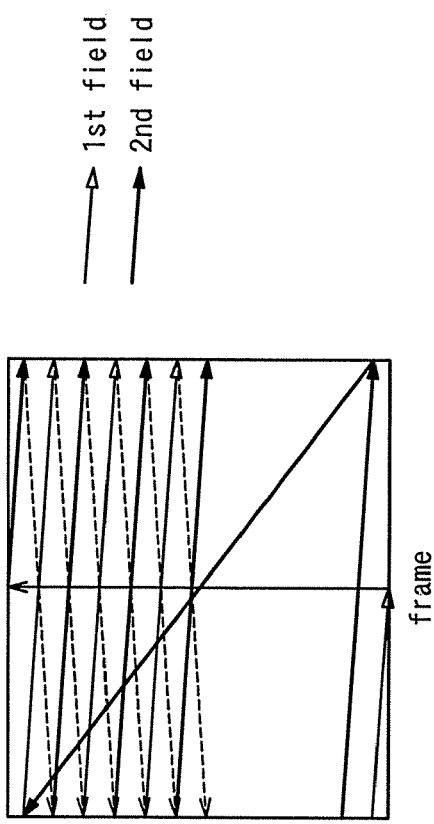
FIG. 4A shows the direction of scanning lines on a display screen showing an NTSC (National Television System Committee) picture signal (color burst signal)
Figure 4B:
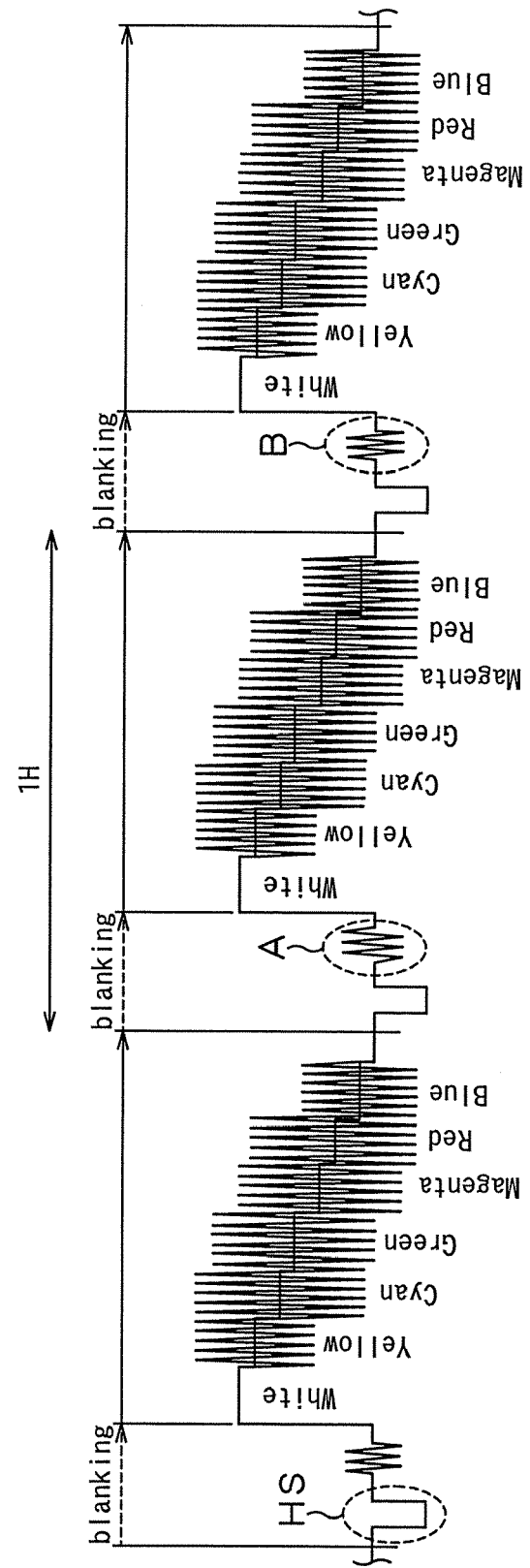
FIG. 4B shows the NTSC picture signal (color burst signal).

The NTSC picture signal is a signal including picture elements (pixel) resulted from division of a picture and which are called one after another onto a scanning line from the upper left toward lower right on a display screen as shown in FIG. 4A. It is also a signal including brightness and color signals and has appended thereto various sync signals indicating positions of various pixels. It is subjected to VSM (Vestigial Sideband Modulation) for transmission. FIG. 4B shows a time waveform of an NTSC picture signal (base-band signal) after having a horizontal sync signal HS appended thereto. It should be noted that FIG. 4B shows also the waveform of a color burst signal.

On the screen displaying a color bar, the same picture is repeated vertically. Therefore, the base-band signal has a pattern in which one line is repeated at every 63.556 μsec (this period will be referred to as "1H (horizontal sync period)" hereunder). Also, a sync signal interval inserted at every line is called "horizontal blanking interval", and sync signals of color sub-carriers in a latter portion of the horizontal blanking interval will be called "color burst signals A and B". The color burst signals A and B are reference signals for color signals. The reference signals are of 3.58 MHz in frequency which is 445/2 times higher than the horizontal sync frequency in the NTSC. Thus, the color signal has the phase thereof inverted at every line (as indicated with letters A and B in FIG. 4B).

As above-mentioned, the OFDM-modulated signal received by the receiver 1 includes the NTSC picture signal. Utilizing the periodicity of the NTSC signal, the interference wave canceling filter 18 and interference wave detector 19 in the receiver 1 detects and cancels, as an interference wave, the NTSC picture signal included in the OFDM time-domain signal. More specifically, the interference wave detector 19 is formed from an autocorrelator showing periodic delays.

Figure 5:
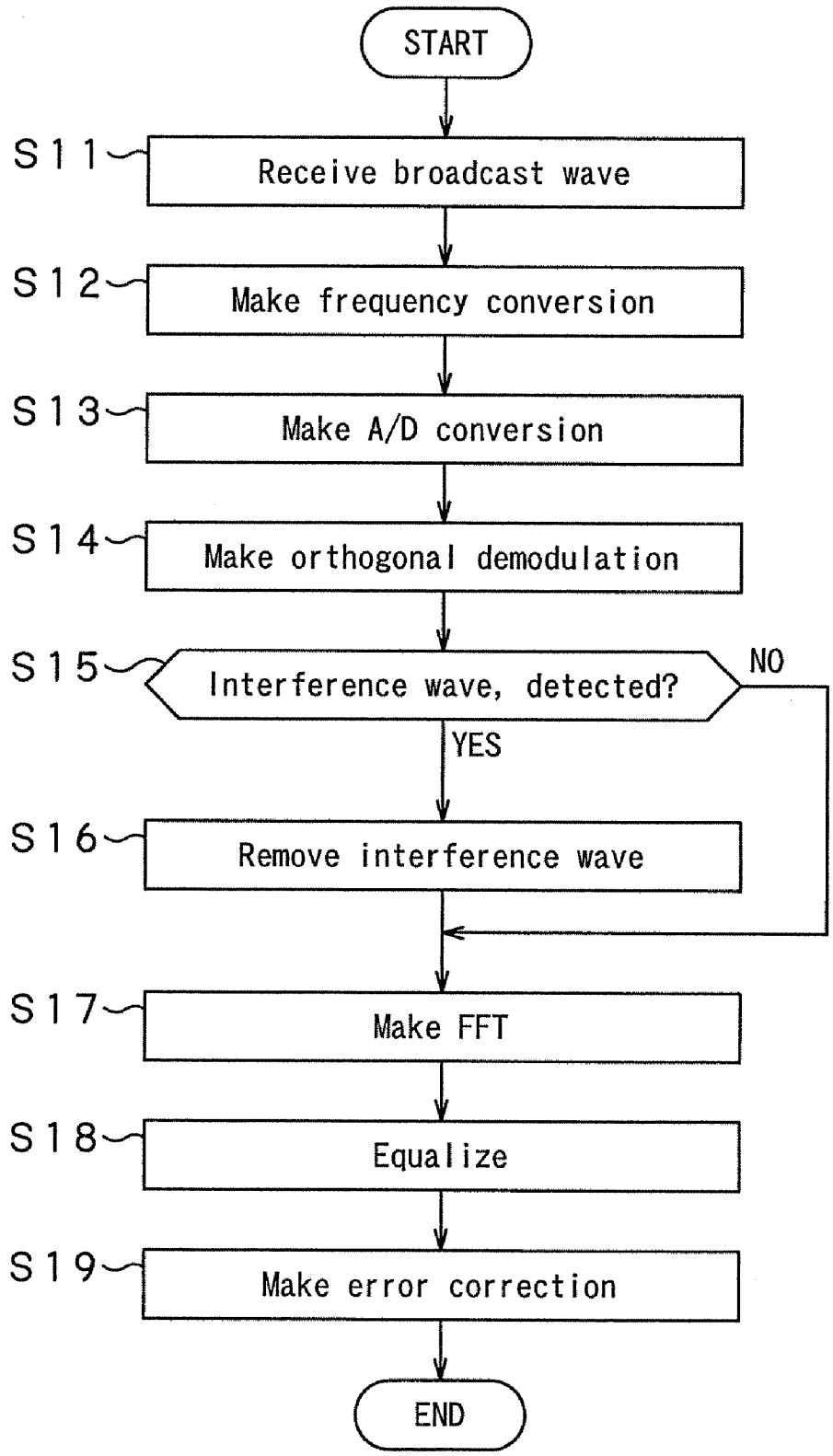
FIG. 5 shows a flow of operations made in the process of demodulation in the receiver.

Of the receiver 1, the above-mentioned components operate as will be explained below with reference to the flow diagram in FIG. 5 to demodulate a received OFDM-modulated signal.

First in step S11, the antenna 11 receives a digital broadcast wave and supplies an RF signal, having a carrier frequency fc, of the received digital broadcast wave to the frequency conversion circuit 12.

In step S12, the frequency conversion circuit 12 makes frequency conversion of the RF signal of the carrier frequency fc supplied from the antenna 11 into an IF signal having an intermediate frequency fIF, and supplies the IF signal to the A-D conversion circuit 14.

In step S13, the A-D conversion circuit 14 digitalizes the IF signal of the intermediate frequency fIF supplied from the frequency conversion circuit 12, and supplies the digital IF signal to the orthogonal demodulation circuit 15.

In step S14, the orthogonal demodulation circuit 15 makes orthogonal demodulation of the IF signal supplied from the A-D conversion circuit 14, and supplies a base-band OFDM time-domain signal to the interference wave canceling filter 18 and interference wave detector 19.

In step S15, the interference wave detector 19 detects an interference wave to determine whether the interference wave is included in the broadcast wave. In the demodulation process, if it is determined in step S15 that an interference wave is included in the broadcast wave, the operation goes to step S16. If it is determined that no interference wave is included in the broadcast wave, the operation goes directly to step S17. It should be noted that the operation of determination will be explained in detail later.

In step S16, the interference wave canceling filter 18 cancels the interference wave from the OFDM time-domain signal supplied from the orthogonal demodulation circuit 15 and supplies the interference wave-free signal to the FFT circuit 20. It should be noted that when it is determined in step S15 that no interference wave is included in the broadcast wave, the interference wave canceling filter 18 will not make any filtration but supply the OFDM time-domain signal directly to the FFT circuit 20.

In step S17, the FFT circuit 20 converts the OFDM time-domain signal supplied from the interference wave canceling filter 18 into an OFDM frequency-domain signal, and supplies this signal to the equalization circuit 21.

In step S18, the equalization circuit 21 makes a distortion correction of the OFDM frequency-domain signal supplied from the FFT circuit 20, and supplies the corrected signal to the error correction circuit 22.

In step S19, the error correction circuit 22 makes de-interleaving, Viterbi decoding, Reed-Solomon decoding and the like of the OFDM frequency-domain signal subjected to the distortion correction in the equalization circuit 21 to demodulate the OFDM frequency-domain signal into information signal such as picture signal and sound signal.

Note here that the receiver 1 may not necessarily be formed from the hardware components as above but may be adapted to allow a computer to execute a program which is based on the above-mentioned steps of operation.

First Construction Example of the Interference Wave Detector 19

Figure 6:
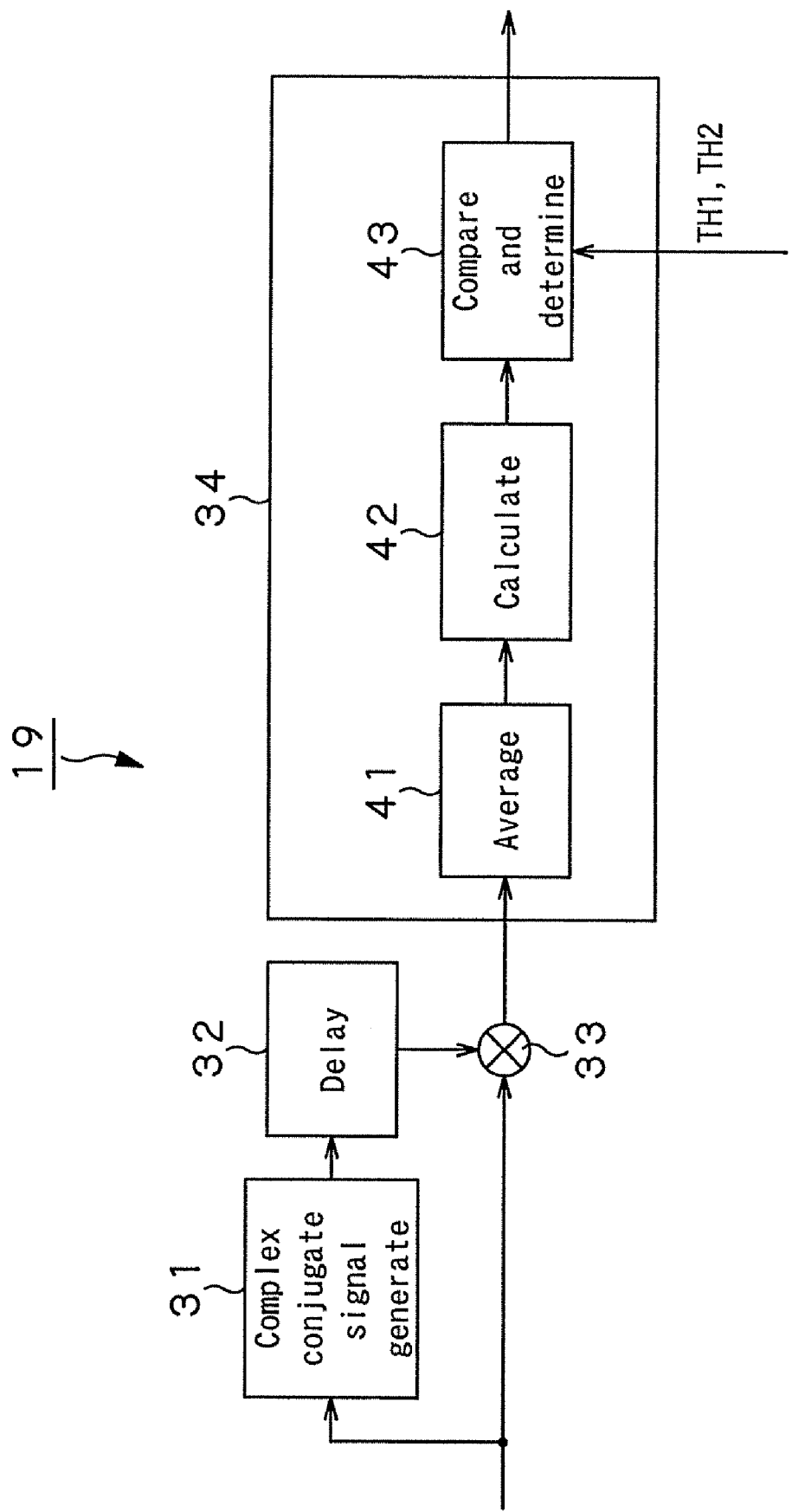
FIG. 6 is a schematic block diagram of a first standard construction example of an interference wave detector provided in the receiver according to the present invention.

The interference wave detector 19 is constructed as will be explained below with reference to FIG. 6. As shown, the interference wave detector 19 includes a complex conjugate signal generator 31, delay unit 32, complex multiplier 33 and determination unit 34.

The complex conjugate signal generator 31 generates a complex conjugate signal of the OFDM time-domain signal (complex signal including the I- and Q-channel signals) supplied from the orthogonal demodulation circuit 15.

For calculation of an auto-correlation, the delay unit 32 delays, by an integral multiple of 1H or 2H, the complex conjugate signal from the complex conjugate signal generator 31.

The complex multiplier 33 makes complex multiplication on the basis of the complex signal generated by the orthogonal demodulation circuit 15 and complex conjugate signal delayed by the integral multiple of the predetermined time by the delay unit 32.

The determination unit 34 makes a comparison of a complex multiplication value calculated by the complex multiplier 33 with an arbitrary threshold to determine whether an interference wave is included in the modulated signal.

The length of the delay given by the delay unit 32 should preferably be an integral multiple of 1H or 2H. It should be noted that in case a color signal component is to be detected in the OFDM time-domain signal, the delay length should be an integral multiple of 2H for a color burst signal included in the color signal has been inverted at every 1H. That is to say, in case the delay length is an integral multiple of 1H, the correlation will be lower due to the color burst signal in a calculation made in the complex multiplier 33 provided downstream of the delay unit 32. Thus, the interference wave detector 19 will not be able to accurately detect a NTSC picture signal unless the delay length is set to an integral multiple of 2H.

Also, since a picture sent from the broadcast station is generally a varying image such as a motion picture, not any color-bar image, the delay by an integral multiple of 1H will not always assure a correlation. However, it is considered that an interval of a few lines between images even in an ordinary picture will not cause the picture to vary largely and that a sufficiently high correlation can be assured when the delay length is relatively small.

The determination unit 34 is constructed as will be explained next. As shown in FIG. 6, the determination unit 34 includes an averaging unit 41, calculation unit 42 and comparison and determination unit 43.

The averaging unit 41 averages a plurality of complex multiplication values provided by the complex multiplier 33.

The calculation unit 42 calculates the magnitude or power of the mean complex multiplication value from the averaging unit 41.

The comparison and determination unit 43 makes a comparison between the magnitude or power calculated by the calculation unit 42 and determines whether an NTSC picture signal is included in the OFDM time-domain signal as will be explained below.

That is, when the magnitude or power of the complex multiplication value calculated by the calculation unit 42 is larger than a first arbitrary threshold TH1, the comparison and determination unit 43 will determine that an interference wave (NTSC picture signal) is included in the OFDM time-domain signal. Also, when the magnitude or power of the complex multiplication value calculated by the calculation unit 42 is smaller than a second arbitrary threshold TH2, the comparison and determination unit 43 will determine that no interference wave (NTSC picture signal) is included in the OFDM time-domain signal.

Note here that the first threshold TH1 is larger than the second threshold TH2. Also, the values of the first and second thresholds TH1 and TH2 are freely set by a user interface provided in the receiver 1. It should also be noted that these thresholds may not be set each time by the user but may be pre-recorded in a register provided in the recorder 1 and read from the register to the comparison and determination unit 43.

In case the comparison and determination unit 43 determines that an NTSC picture signal is included in the OFDM time-domain signal, it will turn on the interference wave canceling filter 18. On the other hand, if the comparison and determination unit 43 determines that no NTSC picture signal is included in the OFDM time-domain signal, it will turn off the interference wave canceling filter 18. It should be noted that if an NTSC picture signal is included in the OFDM time-domain signal, the correlation will be higher. On the other hand, if no interference NTSC picture signal is included in the OFDM time-domain signal, the correlation will be lower.

Figure 7:
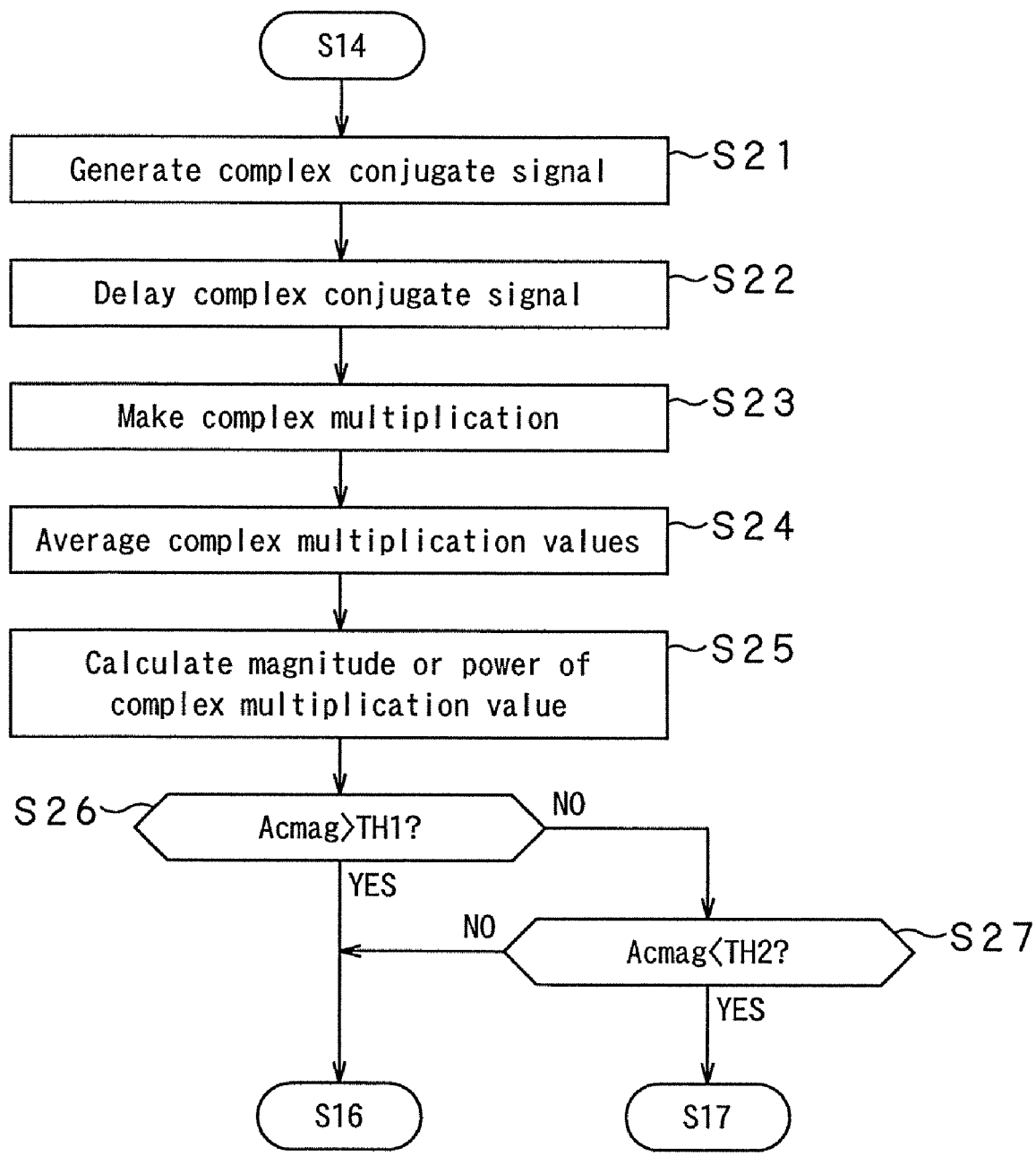
FIG. 7 shows a flow of operations made in the process of interference wave detection in the first standard example.

The interference wave detector 19 detects an interference wave by means of its components operating in steps that will be described below with reference to the flow diagram in FIG. 7. It should be noted that these steps of operation are performed in step S15 included in the aforementioned steps of operation of the receiver 1. That is, it is presumed that the steps of operation of the interference wave detector 19 will start at completion of the aforementioned step S14.

In step S21, the complex conjugate signal generator 31 generates a signal of a component being in conjugation with the OFDM time-domain signal supplied from the orthogonal demodulation circuit 15, and supplies the complex conjugate signal to the delay unit 32.

In step S22, the delay unit 32 delays, by an integral multiple of 1H or 2H, the complex conjugate signal supplied from the complex conjugate signal generator 31. Then, the delay unit 32 supplies the delayed complex conjugate signal to the complex multiplier 33.

In step S23, the complex multiplier 33 makes complex multiplication on the basis of the complex signal delayed by the integral multiple of the predetermined period by the delay unit 32 and complex signal supplied directly from the orthogonal demodulation circuit 15. Then the complex multiplier 33 supplies the complex multiplication value resulted from the complex multiplication to the averaging unit 41.

In step S24, the averaging unit 41 averages a plurality of complex multiplication values resulted from the complex multiplication made by the complex multiplier 33. Then, the averaging unit 41 supplies the mean multiplication value to the calculation unit 42.

In step S25, the calculation unit 42 calculates the magnitude or power of the mean complex multiplication value supplied from the averaging unit 41. Then, the calculation unit 42 supplies the calculated magnitude or power to the comparison and determination unit 43.

In step S26, the comparison and determination unit 43 determines whether the magnitude or power calculated by the calculation unit 42 is larger than the first threshold TH1. In case the comparison and determined unit 43 has determined that the magnitude or power is larger than the first threshold TH1, the operation goes to step S16. If it has determined that the magnitude or power is not larger than the first threshold TH1, the operation goes to step S27.

In step S27, the comparison and determination unit 43 determines whether the magnitude or power calculated by the calculation unit 42 is smaller than the second threshold TH2. In case the comparison and determined unit 43 has determined that the magnitude or power is smaller than the second threshold TH2, the operation goes to step S17. If it has determined that the magnitude or power is not smaller than the second threshold TH2, the operation goes to step S16.

Note that since the steps of operation following steps S16 and S17 have been described above, they will not be described again. The interference wave detector 19 may not necessarily be formed from the hardware components as above but may be adapted to allow a computer to execute a program which is based on the above-mentioned steps of operation.

As above, the interference wave detector 19 calculates an auto-correlation of the OFDM time-domain signal with the use of the integral multiple of 1H or 2H to detect, based on the existence of a correlation, whether an NTSC picture signal is included in the OFDM time-domain signal and adaptively turn on and off the interference wave canceling filter 18 on the basis of whether an NTSC picture signal is detected or not in the OFDM time-domain signal. Thus, the interference wave detector 19 can accurately detect even a smaller interference wave independently of the condition of the transmission channel and the performance of the receiver 1 itself can be maintained at a constant level.

Second Construction Example of the Interference Wave Detector 19

Figure 8:
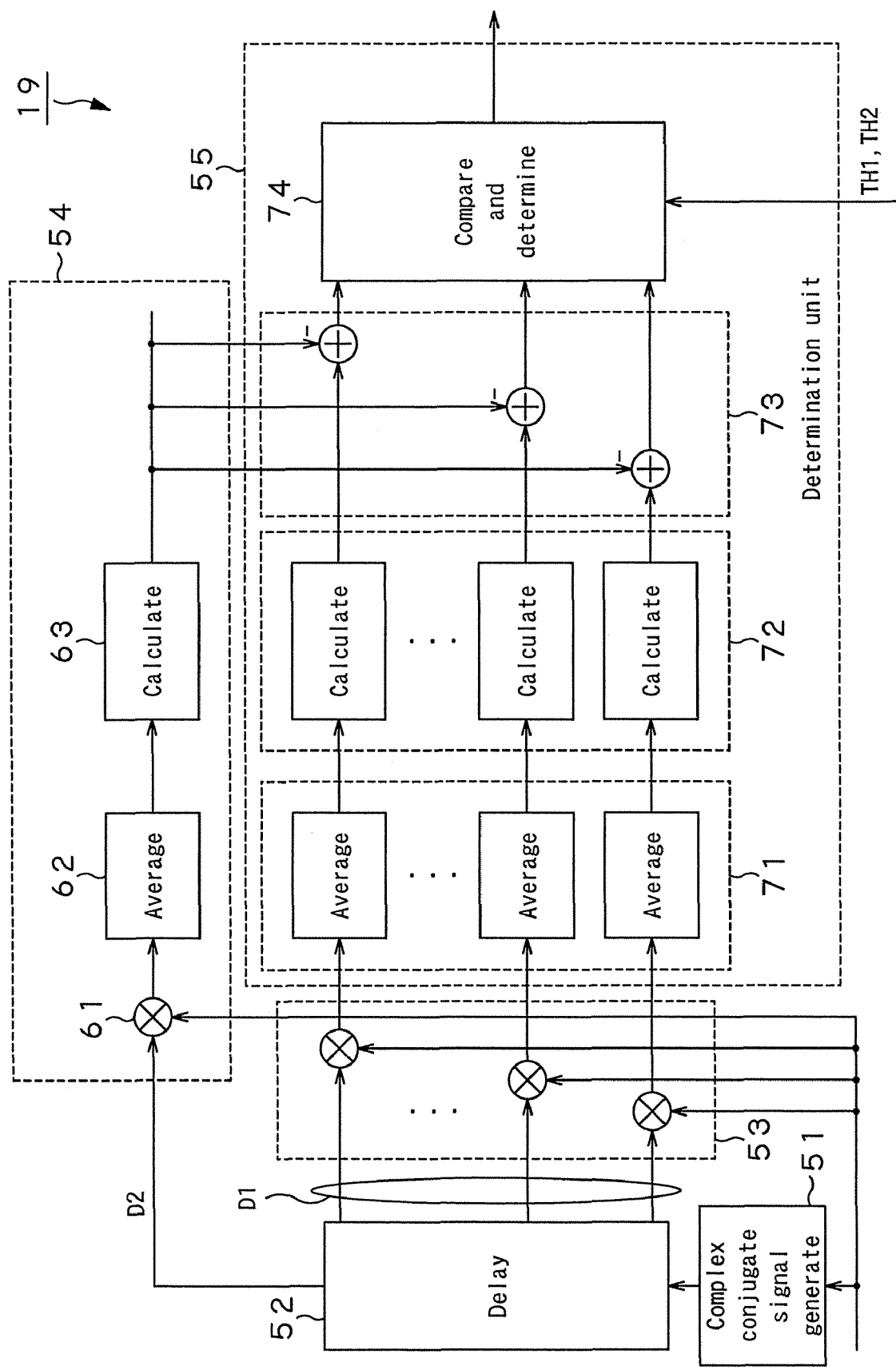
FIG. 8 is a schematic block diagram of a second standard construction example of an interference wave detector provided in the receiver according to the present invention.

The interference wave detector 19 is constructed as will be explained below with reference to FIG. 8. The interference wave detector 19 can detect an interference wave with an improved accuracy using a noise component (will be referred to as "background component" hereunder) evenly included in the transmission channel as will be explained below.

As shown, the interference wave detector 19 includes a complex conjugate signal generator 51, delay unit 52, complex multiplier group 53, background component detector 54 and determination unit 55.

The complex conjugate signal generator 51 generates a complex conjugate signal of the OFDM time-domain signal (complex signal including the I- and Q-channel signals) supplied from the orthogonal demodulation circuit 15.

For calculation of an auto-correlation, the delay unit 52 delays, by an integral multiple of 1H or 2H, the complex conjugate signal from the complex conjugate signal generator 51. The delay unit 52 also delays, by an arbitrary multiple other than the integral multiple of 1H or 2H, the complex conjugate signal supplied from the complex conjugate signal generator 51.

The complex multiplier group 53 makes complex multiplication on the basis of the complex signal generated by the orthogonal demodulation circuit 15 and complex conjugate signal D1 delayed by the integral multiple of 1H or 2H by the delay unit 52.

The background component detector 54 makes complex multiplication on the basis of the complex conjugate signal D2 delayed by the arbitrary multiple other than the integral multiple of 1H or 2H by the delay unit 52 and complex signal generated by the orthogonal demodulation circuit 15 to detect a background component.

The determination unit 55 subtracts the background component detected by the background component detector 54 from the complex multiplication value resulted from the complex multiplication made by the complex multiplier group 53 and makes a comparison between the remainder as a result of the subtraction and an arbitrary threshold to determine whether a interference wave is included in the modulated signal.

The above-mentioned background component detector 54 includes a complex multiplier 61, averaging unit 62 and calculation unit 63.

The complex multiplier 61 makes complex multiplication on the basis of the complex conjugate signal D2 delayed by the arbitrary multiple other than the integral multiple of 1H or 2H by the delay unit 52 and complex signal generated by the orthogonal demodulation circuit 15.

The averaging unit 62 averages a plurality of complex multiplication values resulted from the complex multiplication made by the complex multiplier 61.

The calculation unit 63 calculates the magnitude or power of the mean complex multiplication value supplied from the averaging unit 62 to provide a background component.

The determination unit 55 is constructed as above and includes an averaging group 71, calculation group 72, arithmetic group 73 and comparison and determination unit 74.

The averaging group 71 averages the plurality of complex multiplication values resulted from the complex multiplication made by the complex multiplier group 53.

The calculation group 72 calculates the magnitude or power of each of the mean complex multiplication values supplied from the complex multiplier group 53.

The arithmetic group 73 cancels the background component supplied from the calculation unit 63 in the background component detector 54 from each of outputs from the calculation group 72.

The comparison and determination unit 74 determines, based on the result of the arithmetic operations of the arithmetic group 73 and with reference to an arbitrary threshold, whether an NTSC picture signal is included in the OFDM time-domain signal.

Figure 9:
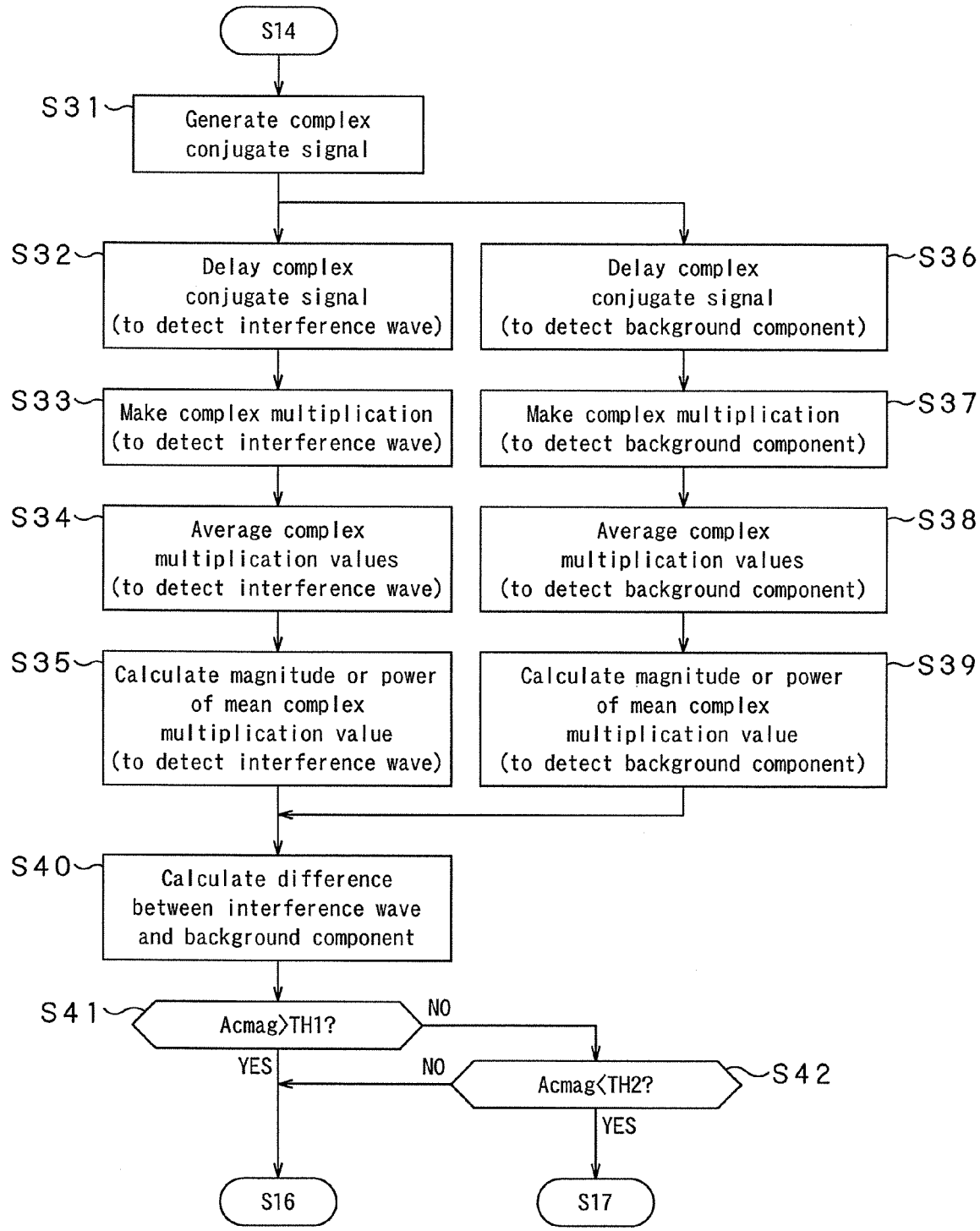
FIG. 9 shows a flow of operations made in the process of interference wave detection in the second standard example.

In the second construction example, the interference wave detector 19 detects an interference wave by means of its components operating in steps that will be described below with reference to the flow diagram in FIG. 9. It should be noted that these steps of operation are performed in step S15 included in the aforementioned steps of operation of the receiver 1. That is, it is presumed that the steps of operation of the interference wave detector 19 will start at completion of the aforementioned step S14.

In step S31, the complex conjugate signal generator 51 generates a complex conjugate signal of the OFDM time-domain signal supplied from the orthogonal demodulation circuit 15, and supplies the generated complex conjugate signal to the delay unit 52.

After completion of step S31, the interference wave detector 19 performs, in parallel, a sequence of interference wave detection including steps S32 to S35 and a sequence of background component detection including steps S36 to S39. The sequence of interference wave detection will be described first.

In step S32, the delay unit 52 delays, by an integral multiple of 1H or 2H, the complex conjugate signal supplied from the complex conjugate signal generator 51 in order to calculate the correlation of an interference wave. Then, the delay unit 52 supplies the complex conjugate signals delayed by a plurality of different intervals to each of complex multipliers included in the complex multiplier group 53.

In step S33, each of the complex multiplier in the complex multiplier group 53 makes complex multiplication on the basis of the complex conjugate signal supplied from the delay unit 52 and complex signal supplied directly from the orthogonal demodulation circuit 15. Then, each complex multiplier in the complex multiplier group 53 supplies the complex multiplication value to each corresponding averaging unit included in the averaging group 71.

In step S34, each averaging unit in the averaging group 71 averages a plurality of complex multiplication values resulted from the complex multiplication made by each of the complex multipliers in the complex multiplier group 53. Then, each averaging unit in the averaging group 71 supplies the mean multiplication value as an interference wave component to each corresponding arithmetic unit in the arithmetic group 73.

Thereafter, the operation goes to step S40. However, the operation to be made in step S40 will be explained after explanation of the sequence of background component detection.

In step S36, the delay unit 52 delays, by an arbitrary multiple other than the integral multiple of 1H or 2H, the complex conjugate signal supplied from the complex conjugate signal generator 51. Then, the delay unit 52 supplies the complex multiplier 61 with the complex conjugate signal delayed by the arbitrary multiple other than the integral multiple of 1H or 2H.

In step S37, the complex multiplier 61 makes complex multiplication on the basis of the complex conjugate signal supplied from the delay unit 52 and complex signal supplied directly from the orthogonal demodulation circuit 15. Then, the complex multiplier 61 supplies the complex multiplication value resulted from the complex multiplication to the averaging unit 62.

In step S38, the averaging unit 62 averages the complex multiplication values supplied from the complex multiplier 61. Then, the averaging unit 62 supplies the means complex multiplication value to the calculation unit 63.

In step S39, the calculation unit 63 calculates the magnitude or power of the complex multiplication value from the mean complex multiplication value supplied from the averaging unit 62. Then the calculation unit 63 supplies the calculated magnitude or power of the complex multiplication value as a background component to each of the arithmetic units included in the arithmetic group 73.

In step S40, each of the arithmetic units in the arithmetic group 73 calculates a difference between the interference wave component supplied from each calculation unit included in the calculation group 72 and background component supplied from the calculation unit 63. Then each of the arithmetic units included in the arithmetic group 73 supplies the result of arithmetic operation to the comparison and determination unit 74.

In step S41, the comparison and determination unit 74 determines whether the magnitude or power of the results of arithmetic operation supplied from each arithmetic unit is the arithmetic group 73 is larger than the first threshold TH1. In case the comparison and determined unit 74 has determined that the magnitude or power is larger than the first threshold TH1, the operation goes to step S16. If it has determined that the magnitude or power is not larger than the first threshold TH1, the operation goes to step S42.

In step S42, the comparison and determination unit 74 determines whether the magnitude or power of the result of arithmetic operation supplied from each arithmetic unit included in the arithmetic group 73 is smaller than the second threshold TH2. In case the comparison and determined unit 74 has determined that the magnitude or power is smaller than the second threshold TH2, the operation goes to step S17. If it has determined that the magnitude or power is not smaller than the second threshold TH2, the operation goes to step S16.

Note that the operations to be made in steps S16 and S17 will not be described again. Also, the interference wave detector 19 may not necessarily be formed from the hardware components as above but may be adapted to allow a computer to execute a program which is based on the above-mentioned steps of operation.

The interference wave detector 19 calculates an auto-correlation of the plurality of delays to make a comprehensive detection of the existence of an NTSC picture signal on the basis of the result of auto-correlation calculation. More specifically, the interference wave detector 19 calculates an auto-correlation of the integral multiple of 1H and auto-correlation of any other multiple of 1H to detect an NTSC picture signal on the basis of a remainder resulted from subtraction of a mean magnitude of an auto-correlation output of a multiple other than an integral multiple of 1H from a means magnitude (or power) of an auto-correlation output of the integral multiple of 1H, as shown in FIG. 8. Therefore, the interference wave detector 19 can detect an interference wave with a reduced probability of erroneous detection by canceling a background component of an auto-correlation output due to an interference wave other than the NTSC picture signal. Thus, this second construction example of the interference wave detector 19 can detect an NTSC picture signal with a higher accuracy than the aforementioned first construction example.

As above, the interference wave detector 19 calculates an auto-correlation of the plurality of delays of the OFDM time-domain signal to detect, based on the result of a comprehensive detection of the existence of a correlation, whether an NTSC picture signal is included in the OFDM time-domain signal and adaptively turn on and off the interference wave canceling filter 18 on the basis of whether an NTSC picture signal is detected or not in the OFDM time-domain signal. Thus, the interference wave detector 19 can accurately detect even a smaller interference wave independently of the condition of the transmission channel and the performance of the receiver 1 itself can be maintained at a constant level.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. A demodulating apparatus that receives a signal modulated with the orthogonal frequency division multiplexing (OFDM) technique and demodulates the modulated signal, the demodulating apparatus comprising:
    an orthogonal demodulating means for making orthogonal demodulation of the modulated signal to generate a complex signal including real- and imaginary-axis components;
    a complex-conjugate signal generating means for generating a complex conjugate signal of the complex signal produced by the orthogonal demodulating means;
    a delaying means for delaying, by an integral multiple of a predetermined period, the complex conjugate signal generated by the complex-conjugate signal generating means;
    a complex multiplying means for making complex multiplication on the basis of the complex signal generated by the orthogonal demodulating means and complex conjugate signal delayed by the integral multiple of the predetermined period by the delaying means;
    a determining means for determining whether an interference wave is included in the modulated signal by making a comparison between the complex multiplication value resulted from the complex multiplication made by the complex multiplying means and an arbitrary threshold; and
    an interference wave canceling means for canceling an interference wave from the modulated signal on the basis of the result of determination from the determining means.

2. The apparatus according to claim 1, wherein the predetermined period adopted in the delaying means is a horizontal sync period of the TV signal in the NTSC (National Television System Committee) method.

3. The apparatus according to claim 1, wherein the determining means determines whether an interference wave is included in the modulated signal by averaging a plurality of complex multiplication values resulted from the complex multiplication made by the complex multiplying means and making a comparison between the result of averaging and an arbitrary threshold.

4. The apparatus according to claim 1, wherein the determining means determines that an interference wave is included in the modulated signal when the complex multiplication value resulted from the complex multiplication made by the complex multiplying means is larger than a first arbitrary threshold, while it determines that no interference wave is included in the modulated signal when the complex multiplication value is smaller than a second arbitrary threshold; and
    the first arbitrary threshold is larger than the second arbitrary threshold.

5. The apparatus according to claim 1, further comprising a background detecting means for detecting a background component by delaying, by an arbitrary multiple other than the integral multiple of the predetermined period, the complex conjugate signal generated by the complex conjugate signal generating means,
    the delaying means delaying, by the integral multiple of the predetermined period, the complex conjugate signal generated by the complex conjugate signal generating means;
    the complex multiplying means making complex multiplication on the basis of each of the complex signal generated by the orthogonal demodulating means and complex conjugate signal delayed by the delaying means; and
    the determining means determining whether an interference component is included in the modulated signal by subtracting the background component detected by the background detecting means from the complex multiplication value resulted from the complex multiplication made by the complex multiplying means and making a comparison between the remainder as a result of the subtraction and an arbitrary threshold.

6. A demodulating method of receiving a signal modulated with the orthogonal frequency division multiplexing (OFDM) technique and demodulating the modulated signal, the method comprising the steps of:
    making orthogonal demodulation of the modulated signal to generate a complex signal including real- and imaginary-axis components;
    generating a complex conjugate signal of the complex signal produced in the orthogonal demodulating step;
    delaying, by an integral multiple of a predetermined period, the complex conjugate signal generated in the complex-conjugate signal generating step;
    making complex multiplication on the basis of the complex signal generated in the orthogonal demodulating step and complex conjugate signal delayed by the integral multiple of the predetermined period in the delaying step;
    determining whether an interference wave is included in the modulated signal by making a comparison between the complex multiplication value resulted from the complex multiplication made in the complex multiplying step and an arbitrary threshold; and canceling an interference wave from the modulated signal on the basis of the result of determination made in the determining step.

7. The method according to claim 6, wherein the predetermined period adopted in the delaying step is a horizontal sync period of the TV signal in the NTSC (National Television System Committee) method.

8. The method according to claim 6, wherein in the determining step, whether an interference wave is included in the modulated signal is determined by averaging a plurality of complex multiplication values resulted from the complex multiplication made in the complex multiplying step and making a comparison between the result of averaging and an arbitrary threshold.

9. The method according to claim 6, wherein in the determining step, it is determined that an interference wave is included in the modulated signal when the complex multiplication value resulted from the complex multiplication made in the complex multiplying step is larger than a first arbitrary threshold, while it is determined that no interference wave is included in the modulated signal when the complex multiplication value is smaller than a second arbitrary threshold; and the first arbitrary threshold is larger than the second arbitrary threshold.

10. The method according to claim 6, further comprising a background detecting step of detecting a background component by delaying, by an arbitrary multiple other than the integral multiple of the predetermined period, the complex conjugate signal generated in the complex conjugate signal generating step, in the delaying step, the complex conjugate signal generated by the complex conjugate signal generating means being delayed by the integral multiple of the predetermined period;

in the complex multiplying step, complex multiplication being made on the basis of each of the complex signal generated in the orthogonal demodulating step and complex conjugate signal delayed in the delaying step; and in the determining step, whether an interference component is included in the modulated signal being determined by subtracting the background component detected in the background detecting step from the complex multiplication value resulted from the complex multiplication made in the complex multiplying step and making a comparison between the remainder as a result of the subtraction and an arbitrary threshold.

11. A non-transitory computer readable recording medium having instructions that when executed by a computer allows the computer to receive a signal modulated with the orthogonal frequency division multiplexing (OFDM) technique and demodulate the modulated signal comprising the steps of:

making orthogonal demodulation of the modulated signal to generate a complex signal including real- and imaginary-axis components;

generating a complex conjugate signal of the complex signal produced in the orthogonal demodulating step;

delaying, by an integral multiple of a predetermined period, the complex conjugate signal generated in the complex-conjugate signal generating step;

making complex multiplication on the basis of the complex signal generated in the orthogonal demodulating step and complex conjugate signal delayed by the integral multiple of the predetermined period in the delaying step;

determining whether an interference wave is included in the modulated signal by making a comparison between the complex multiplication value resulted from the complex multiplication made in the complex multiplying step and an arbitrary threshold; and canceling an interference wave from the modulated signal on the basis of the result of determination made in the determining step.

* * * * *